July 31, 1962   J. MALESKO   3,046,629
SOLID BEAD LOCK PIN
Filed Dec. 15, 1960   2 Sheets-Sheet 1
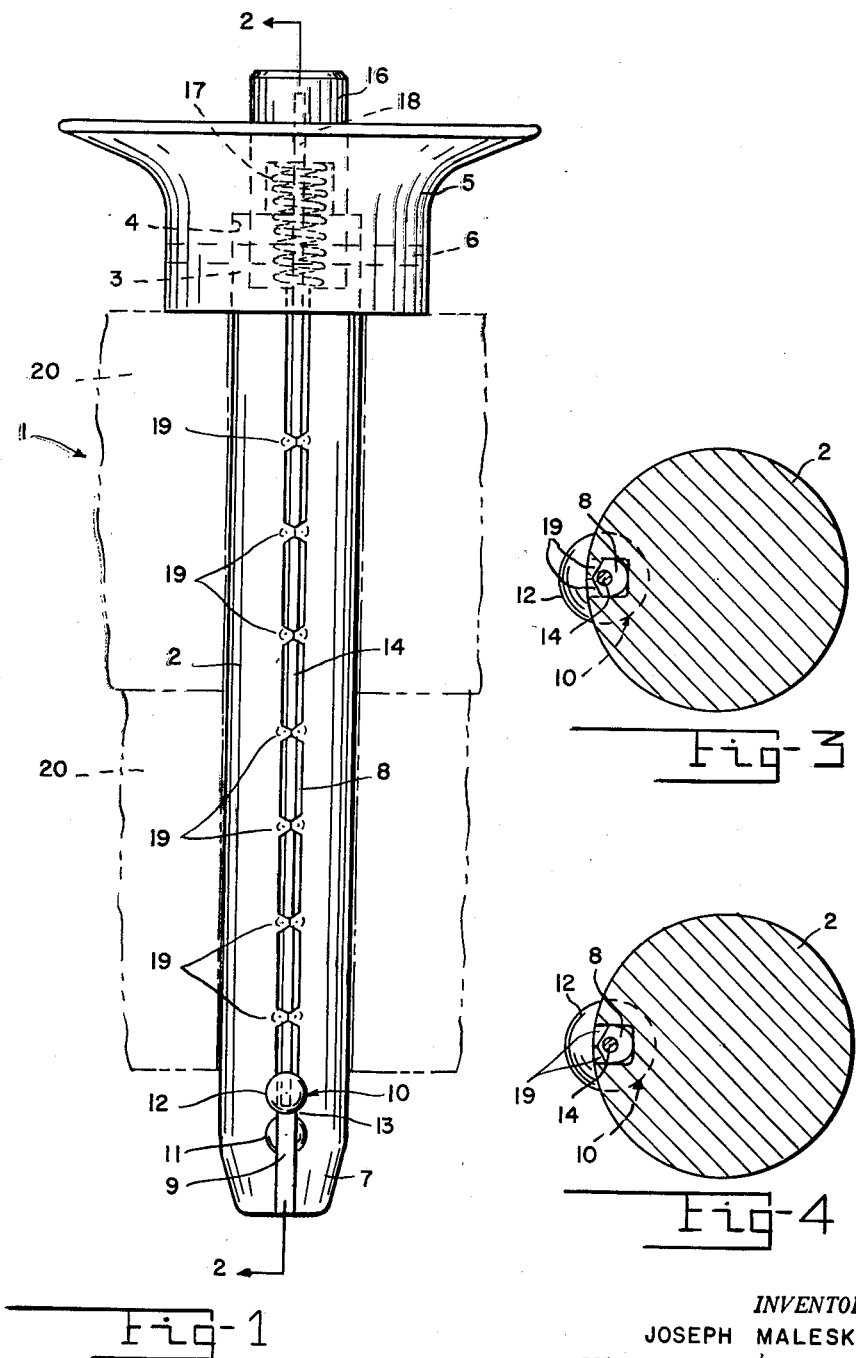
INVENTOR.
JOSEPH MALESKO
BY
ATTORNEYS

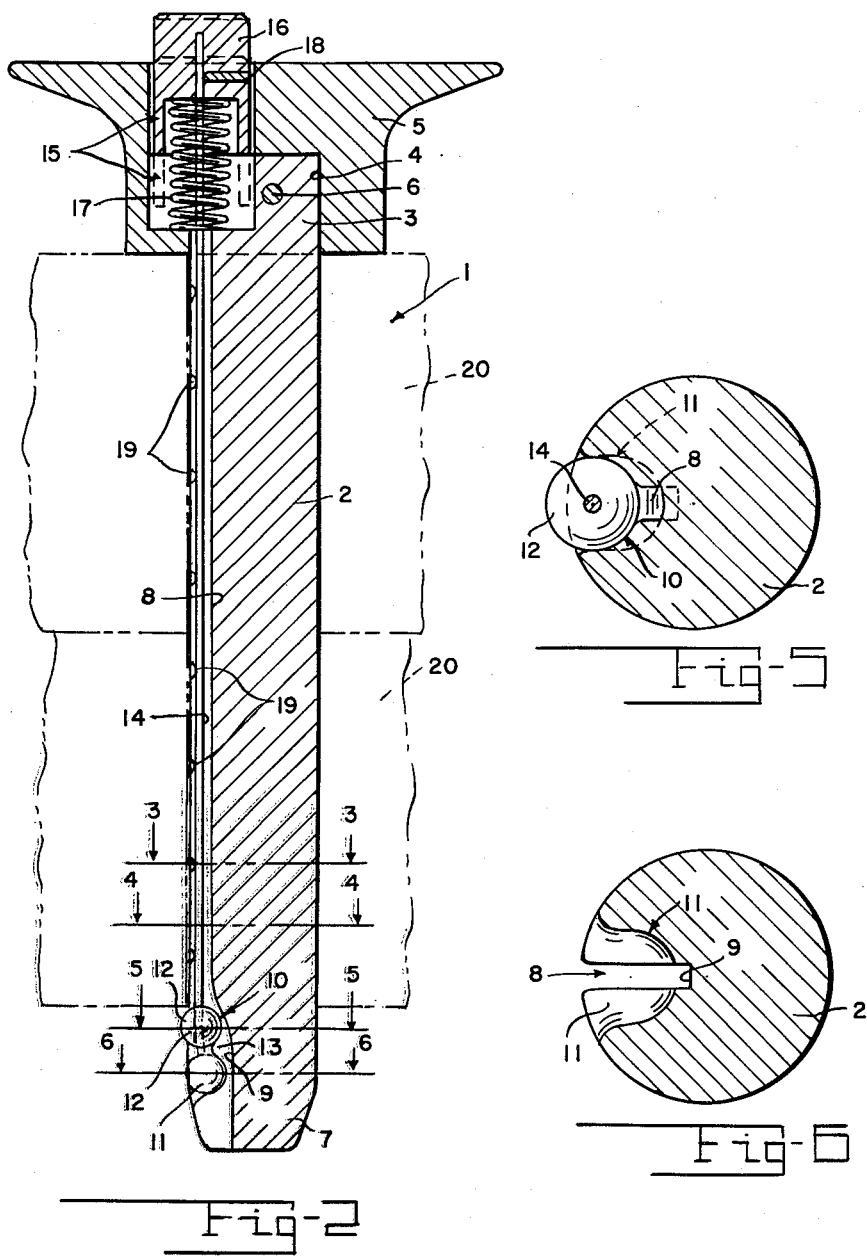

3,046,629
SOLID BEAD LOCK PIN
Joseph Malesko, 1817 Brookline Ave., Dayton, Ohio
Filed Dec. 15, 1960, Ser. No. 76,078
7 Claims. (Cl. 24—211)
(Granted under Title 35, U.S. Code (1952), sec. 266)

The invention described herein may be manufactured and used by or for the United States Government for governmental purposes without payment to me of any royalty thereon.

This invention relates to improvements in pin type fasteners for fastening superimposed plates together, clevis pins, and the like and more particularly to a quickly releasable pin of the locking detent type having a solid body and therefore maximum strength against crushing and bending of the body or shank of the pin, and has for an object the provision of a solid displaceable locking detent bead at or near the insertion end and an actuator in the head end for shifting the detent bead between a locking and a release position, in which the shifting connection between the actuator and the bead lies outside of the solid body of the pin.

A further object is the provision of spring means in the head of the pin for moving the detent bead to its locking position.

A further object is the provision of an elongated cylindrical solid coupling pin with an enlarged head secured thereto having a push button actuator depressible from the top of the head, in which the body of the pin is formed with a shallow longitudinal groove extending from the head to the entrance end which groove terminates at the entrance end in a substantially hemispherical shallow detent receiving depression having a depth considerably less than the diameter of a solid ball shaped detent which is firmly secured to a stiff resilient actuator rod or wire that is fixed to the push button actuator and lies in the confines of the shallow groove, in which the detent is displaced out of the depression by the rod or wire when the push button actuator is depressed, together with a deeper somewhat circular depression formed in the body just below the hemispherical depression to receive the ball shaped detent wholly therein when the same is displaced from the hemispherical depression by the push button actuator and its connected resilient actuator rod or wire.

A further object includes spring means between the head and the push button for tensioning the actuating rod to move the solid detent ball into its locking position in the hemispherical depression.

A further object is the provision of retaining means formed within the confines of the body and extending over the longitudinal shallow wire or rod receiving longitudinal groove.

A further object is the provision of a self-locking pin of the retractable ball detent type which provides maximum strength, ease of operation and manipulation, and is economical to manufacture, with a minimum amount of machining, and is easy to service.

Other and further objects and advantages of the invention will become apparent from the following description and the several figures of the accompanying drawings.

FIG. 1 is a side elevation of the improved solid bead locking pin, incorporating the invention;

FIG. 2 is a longitudinal sectional view of the pin shown in FIG. 1, taken about on the plane as indicated by line 2—2 in FIG. 1; and FIGS. 3, 4, 5 and 6 are transverse fragmentary sectional views taken respectively about on the planes indicated by lines 3—3, 4—4, 5—5, and 6—6 in FIG. 2, looking in the direction of the arrows.

In the drawings the reference numeral 1 denotes generally the improved pin device incorporating the invention, which comprises a solid elongated pin body 2 having at one side a cylindrically recessed upper end 3 inserted in a complemental recess 4 in a flanged head member 5, said pin body 2 and head member 5 being secured together by any suitable means such as a pin 6.

The body 2 is preferably of uniform but interrupted circular cross section throughout the greater portion thereof and is solid, having a slightly tapered lower or insertion end 7, the body being grooved or channelled longitudinally along one side from the head 5 to the insertion end 7 to provide a shallow actuator retaining groove 8 which is somewhat deepened at the insertion end, as indicated at 9, and terminating short of the insertion end of the pin.

The channel or groove 8 is interrupted a slight distance above the entrance end 7 by two locking detent receiving recesses 10 and 11, the upper recess 10 of the two recesses being substantially hemispherical, as seen in the drawings, straddling the groove 8, and seats a solid spherical locking detent or ball member 12 having a diameter considerably greater than the depth of the recess, so that the ball member projects a sufficient distance outwardly beyond the outer surface of the body to provide a solid locking detent, prevented from inward movement into the cylindrical body by the bottom of the upper detent recess 10.

The other or lower recess 11, being located immediately below the recess 10 is formed to completely receive the ball detent 12 when the same is moved downwardly thereinto, the recesses being sufficiently close together to provide inclined or curved surfaces extending upwardly toward each other to permit the ball 12 to slide over this semibarrier 13 back and forth between the two recesses 10 and 11.

The detent ball 12 is fixed to the lower end of a fairly stiff resilient flexible wire or rod 14 which lies straight within the confines of the groove 8 when the ball 12 is disposed in the lower or deeper depression 11, as shown in dotted lines in FIG. 2.

The upper or head end of the body 2 and the head member 5 are formed to provide a cylindrical bore 15 in which is disposed a depressible push button of cylindrical form, as indicated at 16, which is recessed in its inner end to receive a compression spring 17 yieldably urging the push button 16 upwardly. The upper end of the wire 14 is firmly secured in the push button 16 by any suitable means, such as a pin or set screw 18.

The detent actuating wire 14 may be made of spring steel wire, such as "piano wire" and the ball detent 12 swaged on the wire 14 at its lower end and the cylindrical push button 16 swaged or otherwise secured on the upper end of the wire 14, if desired, and is retained in the groove or channel 8 by a series of clips or overhanging abutting finger-like projections 19, projecting from the opposite outer edges of the groove 8, located at suitably spaced distances along the body 2 between the head portion 5 and the entrance end 7. These projections 19 prevent the detent actuating wire 14 from bending outwardly out of the groove 8 when the push button 16 is pressed downwardly to move the wire 14 downwardly to shift the ball detent member 12 from its locking position in the shallower depression 10 to its release position in the deeper release depression 11.

It is preferable that the spring wire 14 is straight when the ball detent 12 is fully seated in the deeper release depression 11 so that the resilient wire, below the lowermost retainer clips or fingers 19 resiliently urges the ball detent inwardly toward the cylindrical body, and the base of the shallower recess 10 when the ball member is shifted to its detent locking position in the depression 10. It is also preferable that the clips or retaining fingers 19 for the actuated wire 14 do not project outwardly beyond the periphery of the cylindrical body 2 so that the pin member is insertable in a cylindrical opening in the plates 20 or other elements desired to be secured which openings are only slightly larger in diameter than the diameter of the cylindrical body 2.

While I have shown and described the preferred embodiment of the invention for exemplary purposes it will be understood that minor changes in connection, combination and arrangement of parts may be made without departing from the spirit and scope of the invention as defined by the following claims.

I claim:

1. A locking detent pin comprising an elongated body having an enlarged head at one end and an insertion end at its other end and formed with a shallow spherical locking recess adjacent said insertion end for seating a spherical detent locking ball member therein with a material portion of the ball member projecting outwardly beyond the surface of the body, said body having a second deeper spherical detent release recess formed therein between said shallow spherical locking recess and said insertion end, to seat the aforesaid ball detent member therein below the outer surface of said body and formed with an inclined barrier between said recesses, said body having a detent actuating wire receiving groove formed in one side thereof extending longitudinally of the body from said enlarged head across said recesses to said insertion end, a flexible resilient detent actuator wire shiftable longitudinally in said wire receiving groove, a detent ball member seatable in said recesses fixed to one end of said wire for shifting movement by said wire across said inclined barrier between a seated position in the first mentioned spherical detent locking recess and a seated position in said second deeper spherical detent release recess, and shiftable means in said enlarged head connected to the other end of said wire for moving said wire in said groove to move said spherical detent member between its seated positions in said recesses.

2. A detent locking pin comprising an elongated solid body having an abutment head at one end and an insertion end at its other end, said body being formed with a shallow locking detent receiving recess adjacent to and spaced from said insertion end for seating a solid spherical detent locking ball member therein with a material portion thereof projecting materially outward beyond the outer surface of the body, said body having a second deeper spherical detent receiving release recess formed therein adjacent said detent locking recess, between the same and said insertion end, to seat the aforesaid ball member therein below the outer surface of said body, and an oppositely inclined barrier between said recesses, said body having a relatively narrow detent actuating wire receiving channel formed in one side thereof extending longitudinally of said body from said abutment head across said recesses to said insertion end for confining a flexible detent actuating wire therein, a resilient flexible detent actuator wire shiftable longitudinally in said channel, a solid detent ball member fixed to one end of said wire for shifting movement by said wire across said oppositely inclined barrier between a seated position in said shallow spherical locking detent receiving recess and said second deeper spherical detent release recess, and shiftable means in said abutment head fixed to the other end of said wire for shifting the same in said channel to move said spherical detent member over said barrier between its seated positions in said recesses.

3. In a locking pin of the class described, an elongated cylindrical body having an enlarged abutment head at an upper end and a lower insertion end, said body having a narrow wire retaining channel formed in one side thereof extending longitudinally from said head to said insertion end, and formed with a pair of adjacent spherical detent receiving depressions located in said channel adjacent said insertion end with an oppositely inclined barrier wall therebetween, a solid detent ball member for seating engagement in either of said spherical detent receiving depressions, one of said depressions being shallower than the other and formed to receive the ball detent member partly therein to leave a material portion of said ball member projecting outwardly beyond the outer surface of said body, the other of said depressions being formed more deeply to receive the detent ball member wholly therein below the outer surface of the body, a flexible resilient detent actuator wire confined in said channel for longitudinal movement and fixed at one end to said detent ball member for actuation of said ball member over said barrier wall between said seated positions in said recesses, said wire having its opposite end extending into said upper abutment end, a plunger movably mounted in said abutment head for manual actuation in one direction and fixed to said opposite end of said wire, for moving said wire in said channel to shift said ball member into one of said depressions, and resilient means between said plunger and said body for moving said plunger in an opposite direction for actuation of said wire in said channel in an opposite direction to move said detent ball member over said inclined barrier wall into the other of said depressions.

4. A locking pin of the class described comprising a solid elongated cylindrical body having an abutment head portion at one end and an opposite insertion end, said head having a plunger receiving bore extending into the top thereof having an axis parallel to and substantially in alignment with the outer surface of the body, a plunger depressibly mounted in said bore for manual depression into said head, spring means between said plunger and said body for urging said plunger in an opposite direction, said body having a wire confining channel formed in one side thereof in alignment with the axis of said plunger extending longitudinally of said body from said bore to said insertion end, said body having a pair of adjacent spherical detent receiving depressions formed in said one side thereof adjacent the insertion end substantially on the axis of said channel, an inclined abutment wall between said depressions, a solid spherical detent member slidable over said inclined abutment wall and seatable in either of said depressions, and a flexible resilient detent actuator wire confined in said channel having an upper end fixed to said plunger and having a lower end fixed to said solid spherical detent member, whereby depression of said plunger moves the flexible detent wire axially in one direction in said channel to dispose the detent in one of the detent receiving depressions at one side of said inclined abutment wall and movement of said plunger in the opposite direction by said spring means pulls said wire axially in said channel in the opposite direction to shift said solid spherical detent member across said inclined abutment wall to the other side thereof into the other of said detent receiving receiving depressions, one of said detent receiving depressions being sufficiently deep to receive the spherical detent member wholly therein and the other of said depressions being not so deep to receive only a part of the spherical detent member therein with a material part of the detent member projecting outwardly beyond the surface of the body.

5. In a detent locking pin, an elongated cylindrical body having an enlarged abutment head at one end and an opposite insertion end, said body having a substantially U-shaped channel formed in one side thereof extending longitudinally from said head to said insertion and having a shallow spherical detent ball seating depression formed in the outer surface of said body in alignment with said U-shaped channel and in spaced relation to said insertion end, a solid detent ball member seatable in said shallow depression having a diameter sufficient to project materially beyond the surface of the body, said body having a deeper ball seating depression formed therein adjacent said shallow spherical detent ball seating depression in alignment with said U-shaped channel between the said shallow depression and said insertion end, sufficient to receive the said ball member wholly therein below the surface of the body, an oppositely inclined barrier formed in the body between said shallow and deeper depressions, a flexible resilient detent shifter wire confined between said head and said shallow depression in said U-shaped channel against bending, fixed to said detent ball member at one end and extending into said abutment head at its opposite end, a cylindrical push button plunger depressible in the top of said abutment head for manual depression thereof toward said head having its axis disposed substantially in alignment with the axis of said U-shaped channel, said plunger being fixed to said wire for axial movement by said plunger toward said insertion end by manual depression of said plunger to shift said detent ball member over said oppositely inclined barrier from said shallow depression into said deeper depression for displacement of said detent member below the surface of the body, and compression spring means between said plunger and said body for moving said plunger outwardly of said head to pull said detent shifter wire upwardly for moving said detent ball member over said oppositely inclined barrier from said deeper depression into seating position in said shallow depression to prevent inward movement of said detent ball member within the outer surface of said body.

6. In a detent locking pin, an elongated cylindrical body having an enlarged abutment head at one end and an opposite insertion end, said body having a substantially U-shaped wire confining channel formed in one side thereof extending longitudinally of said body from said head to said insertion end and a shallow spherical detent ball seating depression formed in the outer surface of said body in alignment with said U-shaped channel in spaced relation to said insertion end, a solid detent ball member seatable in said shallow spherical depression having a diameter sufficient to project materially beyond the surface of the body, said body having a deeper ball seating depression formed therein adjacent said shallow spherical detent ball seating depression in alignment with said U-shaped channel, between the said shallow depression and said insertion end, sufficient to receive the said ball member wholly therein below the surface of the body, an oppositely inclined barrier formed in the body between said shallow and deeper depressions, a flexible resilient detent shifter wire confined in said U-shaped channel between said head and said shallow depression against bending, fixed to said detent ball member at one end, and extending into said abutment head at its opposite end, a cylindrical push button plunger depressible in the top of said abutment head for manual depression thereof toward said head having its axis disposed substantially in alignment with the axis of said U-shaped channel, said plunger being fixed to said wire for axial movement by said plunger toward said insertion end by manual depression of said plunger to shift said detent ball member over said oppositely inclined barrier from said shallow depression into said deeper depression for displacement of said detent member below the surface of the body, compression spring means between said plunger and said body for moving said plunger outwardly of said head to pull said detent shifter wire upwardly for moving said detent ball member over said oppositely inclined barrier from said deeper depression into seating position in said shallow depression to prevent inward movement of said detent ball member within the outer surface of body, said longitudinal channel opening outwardly of the body from the abutment head to said insertion end and having a confining width and depth to prevent material lateral bending of the resilient detent actuating wire in the direction toward the sides and bottom of the U-shaped channel, and a plurality of retaining fingers extending across the entrance of the channel at a plurality of longitudinally spaced locations along the channel from the shallow depression to the head for preventing outward bending of said detent wire out of said channel away from the body.

7. Apparatus as claimed in claim 6 including stop means between said plunger and the abutment head for limiting the movement of the plunger in its downward direction to selectively position said detent member in said deeper ball seating depression.

References Cited in the file of this patent
UNITED STATES PATENTS 2,322,852   Kost _____ June 29, 1943

FOREIGN PATENTS 553,770   Great Britain _____ June 4, 1943